(12) United States Patent
Hamada et al.

(10) Patent No.: US 10,935,269 B2
(45) Date of Patent: Mar. 2, 2021

(54) VENTILATOR, AND DEFROSTING METHOD

(71) Applicant: Mitsubishi Electric Corporation, Tokyo (JP)

(72) Inventors: Mamoru Hamada, Tokyo (JP); Hayato Horie, Tokyo (JP); Masaki Toyoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 15/768,845

(22) PCT Filed: Jan. 8, 2016

(86) PCT No.: PCT/JP2016/050522
§ 371 (c)(1),
(2) Date: Apr. 17, 2018

(87) PCT Pub. No.: WO2017/119122
PCT Pub. Date: Jul. 13, 2017

(65) Prior Publication Data
US 2019/0056134 A1  Feb. 21, 2019

(51) Int. Cl.
*F24F 11/41* (2018.01)
*F24F 7/08* (2006.01)
(Continued)

(52) U.S. Cl.
CPC ........... *F24F 11/41* (2018.01); *F24F 7/08* (2013.01); *F24F 11/89* (2018.01); *F24F 12/006* (2013.01);
(Continued)

(58) Field of Classification Search
CPC .... F24F 7/08; F24F 11/41; F24F 11/42; F24F 11/43; F24F 12/001; F24F 12/006; F24F 11/89
See application file for complete search history.

(56) References Cited

U.S. PATENT DOCUMENTS 3,946,286 A * 3/1976 Kinnunen ............. F25D 21/002
361/175
5,431,215 A * 7/1995 Davis ..................... F24F 12/001
165/11.1
(Continued)

FOREIGN PATENT DOCUMENTS

CN 103742987 B * 6/2016
JP 60017650 A * 1/1985 ............ F24F 12/001
(Continued)

OTHER PUBLICATIONS

International Search Report of the International Searching Authority dated Apr. 5, 2016 for the corresponding international application No. PCT/JP2016/050522 (and English translation).
(Continued)

*Primary Examiner* — Tho V Duong
(74) *Attorney, Agent, or Firm* — Posz Law Group, PLC

(57) ABSTRACT

A ventilator includes an exhaust air duct for exhausting air from an interior space to an outside and a supply air duct for supplying air from the outside to the interior space, and is equipped with a heat exchanger and a defroster. The heat exchanger performs heat exchange between air passing through the exhaust air duct and air passing through the supply air duct. The defroster defrosts, when frost attaches to the heat exchanger, the heat exchanger by, after air flows into the exhaust air duct or the supply air duct, changing a state of the air.

6 Claims, 15 Drawing Sheets

(51) Int. Cl.
*F24F 11/89* (2018.01)
*F24F 12/00* (2006.01)
*F24F 110/10* (2018.01)
*F24F 110/12* (2018.01)

(52) U.S. Cl.
CPC ....... *F24F 2110/10* (2018.01); *F24F 2110/12* (2018.01); *F24F 2221/34* (2013.01); *Y02B 30/56* (2013.01)

(56) References Cited

U.S. PATENT DOCUMENTS

| | | | | |
|---|---|---|---|---|
| 6,199,394 | B1 * | 3/2001 | Maeda | F24F 3/1423 |
| | | | | 62/271 |
| 2013/0118188 | A1 * | 5/2013 | McKie | F24F 12/006 |
| | | | | 62/81 |

FOREIGN PATENT DOCUMENTS

| | | | |
|---|---|---|---|
| JP | S60-182629 | U | 12/1985 |
| JP | H08-145432 | A | 6/1996 |
| JP | 2002-317997 | A | 10/2002 |
| JP | 2009-097807 | A | 5/2009 |
| JP | 2011-202814 | A | 10/2011 |
| JP | 5377606 | B2 * | 12/2013 |
| KR | 100685767 | B1 * | 2/2007 |

OTHER PUBLICATIONS

Office Action dated Jun. 30, 2020 issued in corresponding GB patent application No. 1806765.2.

* cited by examiner

VENTILATOR, AND DEFROSTING METHOD

CROSS REFERENCE TO RELATED APPLICATION

This application is a U.S. national stage application of PCT/JP2016/050522 filed on Jan. 8, 2016, the contents of which are incorporated herein by reference.

TECHNICAL FIELD

The present disclosure relates to a ventilator and a defrosting method.

BACKGROUND ART

A ventilator is known that is equipped with an air supply function for supplying outside air to an interior space and an air exhaust function for discharging interior space air to the outside. When included in an air conditioning system or installed with an air conditioner, this type of ventilator often is equipped with a heat exchanger. This heat exchanger recovers heat by performing heat exchange between the discharged air of the interior space and the supplied outside air. Such recovery of heat lowers the air conditioning load and improves energy utilization efficiency.

When the temperature of the outside air is low, moisture included in the interior space air forms frost on the interior of the heat exchanger. The ventilation air amount decreases when this frost grows and the air duct of the ventilator becomes narrow or blocked. Thus technology is proposed for defrosting by melting the frost of the heat exchanger included in the ventilator (for example, see Patent Literature 1). In Patent Literature 1, technology is described for defrosting the heat exchanger by selectively blocking a portion of a heat exchange flow passage through which air flows from the outside.

CITATION LIST

Patent Literature

Patent Literature 1: Unexamined Japanese Patent Application Kokai Publication No. 2011-202814

SUMMARY OF INVENTION

Technical Problem

However, although the technology described in Patent Literature 1, by defrosting the heat exchanger, enables suppression of the lowering of the ventilation air amount, the ventilation air amount decreases to a certain degree due to the blocking of the portion of the flow passage during defrosting.

In consideration of the aforementioned circumstances, an objective of the present disclosure is to defrost the heat exchanger without causing a lowering of the ventilation air amount.

Solution to Problem

In order to attain the aforementioned objective, the ventilator of the present disclosure is a ventilator including an exhaust air duct for exhausting air from an interior space to an outside and a supply air duct for supplying air from the outside to the interior space. The ventilator includes a heat exchanger configured to perform heat exchange between air passing through the exhaust air duct and air passing through the supply air duct, and defrosting means for, when frost attaches to the heat exchanger, defrosting the heat exchanger by, after the air flows into the exhaust air duct or the supply air duct, changing a state of the air.

Advantageous Effects of Invention

According to the present disclosure, defrosting of the heat exchanger is performed by changing the state of air after flowing into the exhaust air duct or the supply air duct. Thus the heat exchanger can be defrosted without causing a lowering of the ventilation air amount.

DESCRIPTION OF EMBODIMENTS

Embodiments of the present disclosure are described below in reference to drawings.

Embodiment 1

Figure 1:
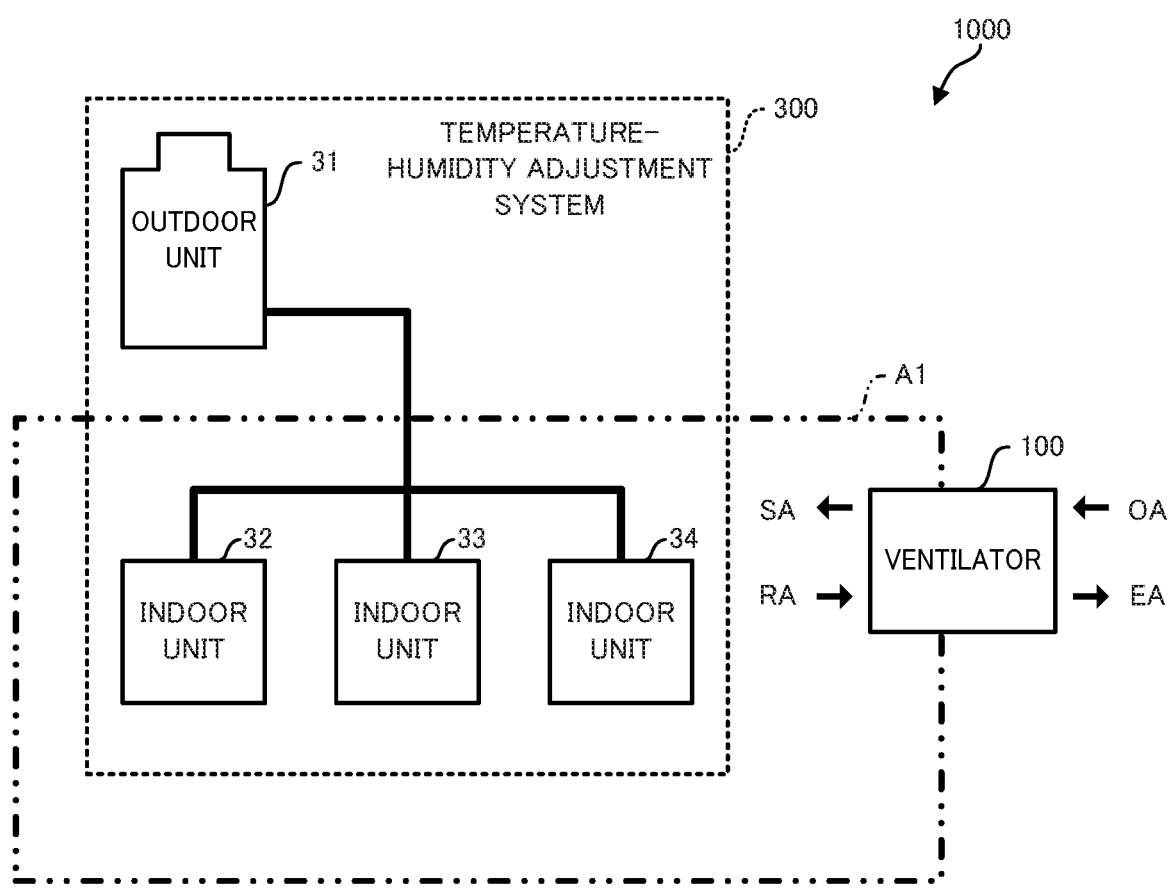
FIG. 1 is a drawing illustrating a configuration of an air conditioning system according to Embodiment 1.

FIG. 1 illustrates a configuration of an air conditioning system 1000 according to Embodiment 1. The air conditioning system 1000 is a system for controlling a state of air within an interior space A1 that is a target of air conditioning. The interior space A1, for example, is a room within a home, a floor of an office building, a workspace within a factory, a storehouse, a passageway, a vehicle interior space, or an underground space. Hereinafter, the interior space A1 is simply referred to as the interior, and the exterior of the interior space A1 is simply referred to as the outside. Further, the outside may be a natural space exposed to the weather or may be a space within a building.

As illustrated in FIG. 1, the air conditioning system 1000 includes a ventilator 100 exchanging air of the interior and air of the outside, and a temperature-humidity adjustment system 300 adjusting temperature and humidity of the air of the interior. The temperature-humidity adjustment system 300 includes an outdoor unit 31 arranged at the outside, and indoor units 32, 33, and 34 that are arranged in the interior and are connected to the outdoor unit 31 via refrigerant distribution lines.

The ventilator 100 supplies air from the outside to the interior by intake of the outside air and blowing out of the supplied air. "OA" in FIG. 1 indicates the outside air, and "SA" indicates the supplied air. Further, the ventilator 100 exhausts air from the interior to the outside by intake of the interior air and blowing out of exhaust air. "RA" in FIG. 1 indicates the air of the interior, and "EA" indicates the exhaust air. Notations indicating the outside air as "OA", the supplied air as "SA", the interior air as "RA", and the exhaust air as "EA" are used in the drawings below to facilitate understanding.

Figure 2:
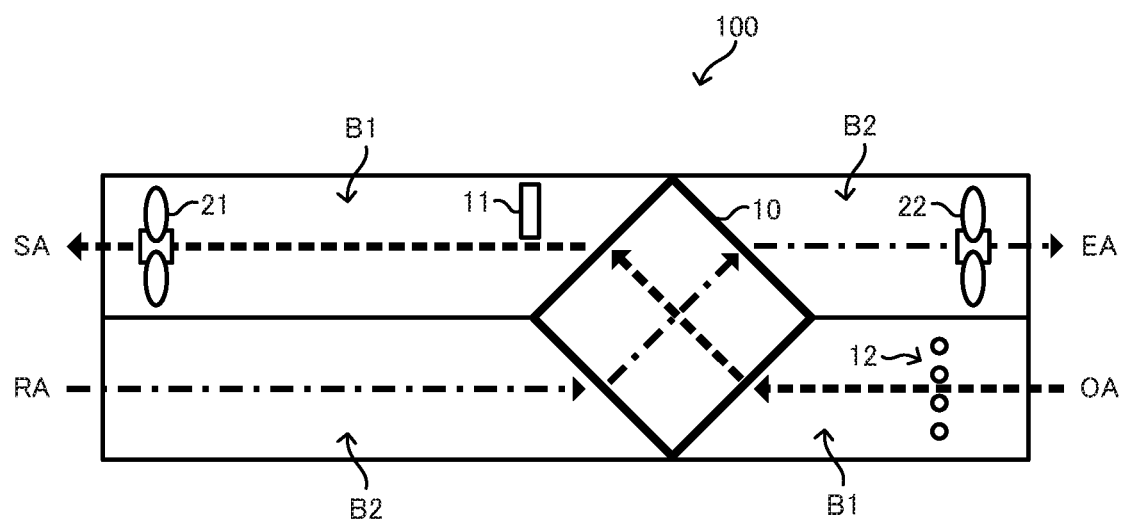
FIG. 2 is a drawing illustrating a configuration of a ventilator according to Embodiment 1.

As illustrated in FIG. 2, the ventilator 100 includes therein a supply air duct B1 for supplying air from the outside to the interior, and an exhaust air duct B2 for exhausting air from the interior to the outside. The supply air duct B1 is a flow passage for intake of the outside air OA and for passage of the air until the air is blown out as the supplied air SA. The exhaust air duct B2 is a flow passage for intake of the interior air RA and for passage of the air until the air is blown out as the exhaust air EA. Further, in FIG. 2, the flow of air within the supply air duct B1 is indicated by a dashed line, and the flow of air within the exhaust air duct B2 is indicated by a dot-dashed line. Further, the supply air duct B1 and the exhaust air duct B2 are mutually independent. That is to say, within the ventilator 100, air does not move between the supply air duct B1 and the exhaust air duct B2.

The ventilator 100 includes a heat exchanger 10 for performing heat exchange between the air passing through the supply air duct B1 and the air passing through the exhaust air duct B2, a temperature sensor 11 for sensing temperature of the air passing through the heat exchanger 10, a defroster 12 for defrosting the heat exchanger 10 after attachment of frost to the heat exchanger 10, a supply air blower 21 arranged in the supply air duct B1, and an exhaust air blower 22 arranged in the exhaust air duct B2.

When the supply air blower 21 makes a fan rotate to blow air in the supply air duct B1, the outside air OA flows into the supply air duct B1, and the air after inflow then passes through the heat exchanger 10 and is supplied to the interior as the supplied air SA. Further, when the exhaust air blower 22 makes a fan rotate to blow air in the exhaust air duct B2, the interior air RA flows into the exhaust air duct B2, and the air after inflow passes through the heat exchanger 10 and is vented to the outside as the exhaust air EA.

The heat exchanger 10 is an energy-recovery heat exchanger formed by alternatingly stacking layers through which the air of the supply air duct B1 flows and layers through which the air of the exhaust air duct B2 flows. In FIG. 2, the heat exchanger 10 is indicated by a rhombic shape formed by bold lines. The heat exchanger 10 is used for recovering heat during the exchange of air by the ventilator 100. For example, in the winter season when air temperature of the interior is maintained by the temperature-humidity adjustment system 300 higher than air temperature of the outside, when the heat exchanger 10 causes heat of the air of the exhaust air duct B2 to transfer to the air of the supply air duct B1, the supplied air SA becomes warmer than the outside air OA, and a portion of the amount of heat of the interior air RA is recovered by the heat exchanger 10.

Figure 3:
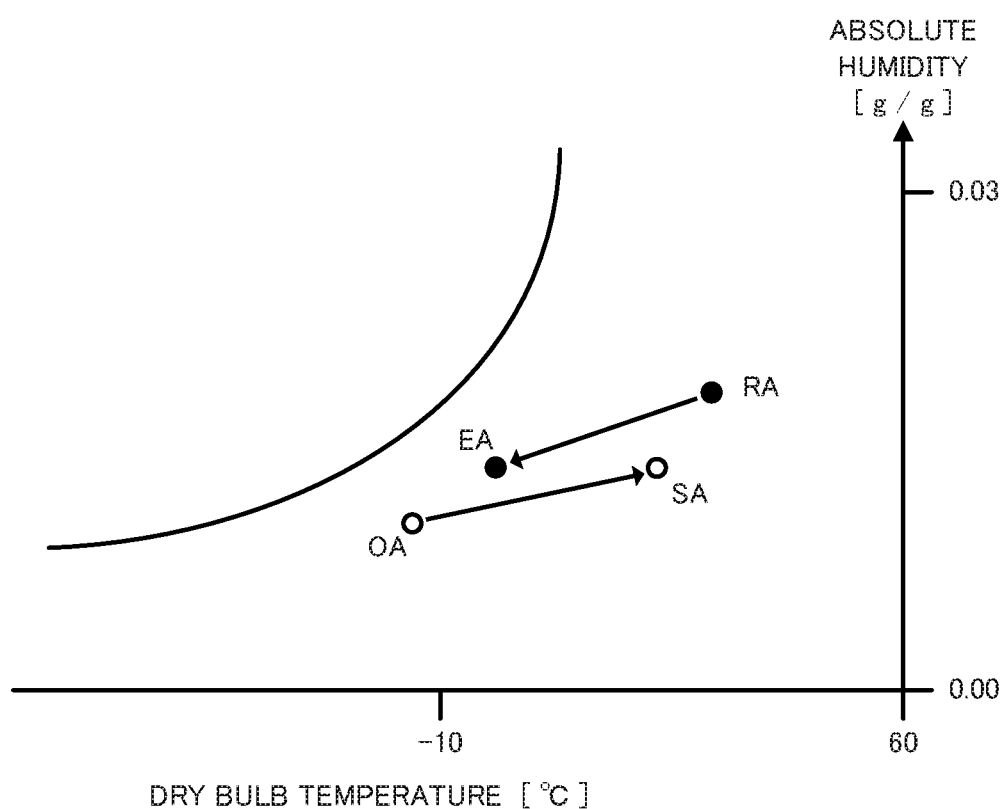
FIG. 3 is a psychrometric chart illustrating an example of a change of state of air due to a heat exchanger.

FIG. 3 illustrates an example, in the winter season, of changes in states of the outside air OA, the supplied air SA, the interior air RA, and the exhaust air EA due to the heat exchanger 10. As illustrated in FIG. 3, after the interior air RA flows into the heat exchanger 10, the outside air OA then exchanges heat therewith so that state of the outside air OA changes to a state approaching that of the interior air RA, and the outside air OA becomes the supplied air SA that has increased temperature and humidity. On the other hand, after the outside air OA flows into the heat exchanger 10, the interior air RA exchanges heat therewith, and thus the state of the interior air RA becomes near the state of the outside air OA, and the interior air RA becomes the exhaust air EA that has lower temperature and humidity.

As may be understood from FIG. 3, due to the heat exchanger 10 recovering heat, the ventilator 100 decreases heating load of the temperature-humidity adjustment system 300 in comparison to the case in which the outside air OA is supplied directly to the interior, thereby contributing to the saving of energy. Further, in the summer season when the temperature of the interior is maintained by the temperature-humidity adjustment system 300 lower than the outside air temperature, heat is recovered by the heat exchanger 10, and thus the ventilator 100 lowers the cooling load of the temperature-humidity adjustment system 300 and contributes to the saving of energy. Specifically, the state of the outside air OA changes to near the state of the interior air RA, the outside air OA becomes the supplied air SA that has lower temperature and humidity, the state of the interior air RA changes to near the state of the outside air OA, and the interior air RA becomes the exhaust air EA that has higher temperature and humidity.

Figure 4:
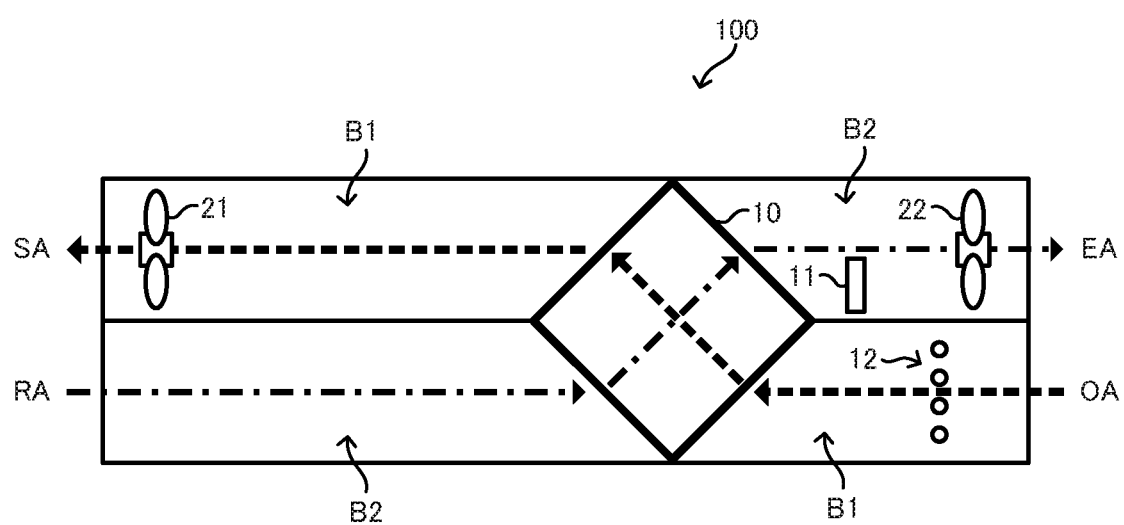
FIG. 4 is a drawing illustrating a modified example of arrangement of a temperature sensor.

Again with reference to FIG. 2, the temperature sensor 11 is configured to include a calculation circuit and a temperature sensor as typified by a resistance thermometer, for example. The temperature sensor 11 according to the present embodiment is arranged in the supply air duct B1, and after air passes through the heat exchanger 10, the temperature sensor 11 measures the temperature of the air in the supply air duct B1. However, this configuration is not limiting, and the temperature sensor 11 may be arranged within the exhaust air duct B2 as indicated in FIG. 4, and after air passes through the heat exchanger 10, the temperature of the air may be measured in the exhaust air duct B2. The temperature sensor 11 is used for sensing frost formation in the heat exchanger 10.

When the temperature of the outside air OA is to a certain degree lower than 0° C., the heat exchanger 10 is sometimes cooled by the outside air OA to a temperature less than or equal to 0° C. In this chase, when the temperature of the interior air RA is maintained at about 20° C., for example, the temperature of the heat exchanger 10 normally becomes lower than the dew point of the interior air RA. When this interior air RA flows into the heat exchanger 10, water vapor included in the interior air RA attaches as frost to the surface of cooled components of the heat exchanger 10. Then when the frost attached to the heat exchanger 10 grows, the exhaust air duct B2 becomes narrow in the heat exchanger 10. This results in decrease of the ventilation air amount of the ventilator 100, and the ventilator 100 becomes unable to maintain the ventilation air amount required for maintaining a pleasant state in the interior space A1. Further, the amount of heat recovered by the heat exchanger 10 decreases.

Figure 5:
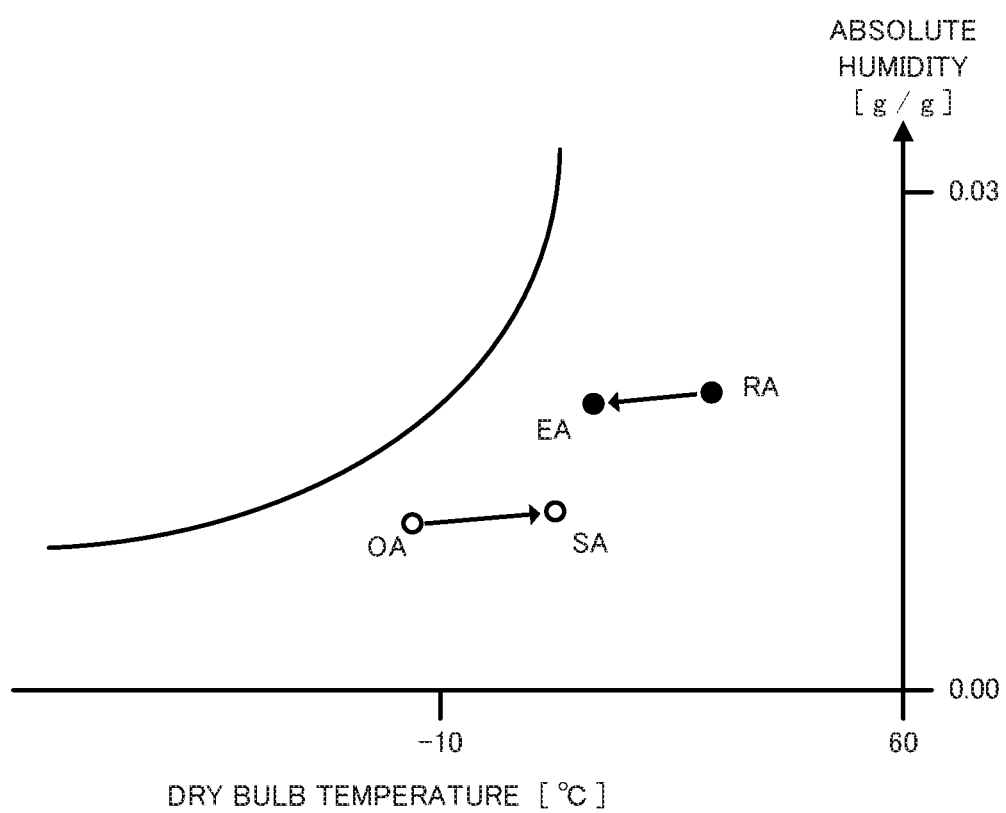
FIG. 5 is a psychometric chart illustrating an example of a change of state of the air after frosting of the heat exchanger.

FIG. 5 illustrates an example of change of states of the outside air OA, the supplied air SA, the interior air RA, and the exhaust air EA occurring when the amount of heat recovered by the heat exchanger 10 decreases in the winter season. As made clear by FIG. 5, when the recovered amount of heat becomes small, the amount of change from the outside air OA to the supplied air SA and the amount of change from the interior air RA to the exhaust air EA become small in comparison to the example illustrated in FIG. 3. That is to say, in comparison to the case in which frost is not attached to the heat exchanger 10, after the supplied air SA passes through the heat exchanger 10 in the supply air duct B1, the temperature of such air becomes high, and after the exhaust air EA passes through the heat exchanger 10 in the exhaust air duct B2, the temperature of such air becomes low. In other words, when frost attaches to the heat exchanger 10, the temperature sensed by the temperature sensor 11 arranged in the supply air duct B1 becomes low.

The calculation circuit of the temperature sensor 11 according to the present embodiment, by determining whether the sensed temperature is below a predetermined first threshold, senses attachment of frost to the heat exchanger 10. Then upon sensing of the attachment of frost to the heat exchanger 10, the temperature sensor 11 outputs to the defroster 12 a signal indicating the attachment of frost to the heat exchanger 10. Further, upon not sensing the formation of frost on the heat exchanger 10, the temperature sensor 11 stops the outputting of the signal to the defroster 12.

The defroster 12 is arranged in the supply air duct B1 as illustrated in FIG. 2 and defrosts the heat exchanger 10 by, after air flows into the supply air duct B1, causing a change in the state of such air. The defroster 12 according to the present embodiment is configured to include a heater for heating air and causes a change in the state of the air by heating the air. The heater of the defroster 12, for example, is a gas heater, an electrical heater, or a heat pump device. Further, in FIG. 2, the defroster 12 is indicated by a cross section of gas piping in a gas heater.

When frost attaches to the heat exchanger 10 and the temperature sensed by the temperature sensor 11 drops below the first threshold, the defroster 12 receives the signal output from the temperature sensor 11 and thus, after the outside air OA flows into the supply air duct B1, heats such air. The air heated by the defroster 12 flows into the heat exchanger 10 and raises the temperature of the heat exchanger 10. When the temperature of the heat exchanger 10 rises, the frost attached to the heat exchanger 10 melts, and thus the heat exchanger 10 becomes defrosted.

Further, when the temperature sensor 11 is arranged in the exhaust air duct B2 as illustrated in FIG. 4, upon attachment of frost to the heat exchanger 10, the temperature measured by the temperature sensor 11 becomes high. In this case, the calculation circuit of the temperature sensor 11 senses the attachment of frost to the heat exchanger 10 by determining whether the sensed temperature exceeds a predetermined second threshold. Then when the temperature sensed by the temperature sensor 11 exceeds the second threshold due to attachment of frost to the heat exchanger 10, the defroster 12 receives the signal output from the temperature sensor 11, and after the outside air OA flows into the supply air duct B1, thereby heats the air.

Further, the ventilator 100 may include both the temperature sensor 11 arranged in the supply air duct B1 and the temperature sensor 11 arranged in the exhaust air duct B2. In the case in which the ventilator 100 has the temperature sensors 11 in each of the supply air duct B1 and the exhaust air duct B2, the defroster 12 executes the defrosting operation when frost attaches to the heat exchanger 10, the temperature sensed by the temperature sensor 11 of the supply air duct B1 is below the first threshold, and the temperature sensed by the temperature sensor 11 of the exhaust air duct B2 exceeds the second threshold.

Next, the procedure of the defrosting method executed by the ventilator 100 is explained with reference to FIG. 6.

Figure 6:
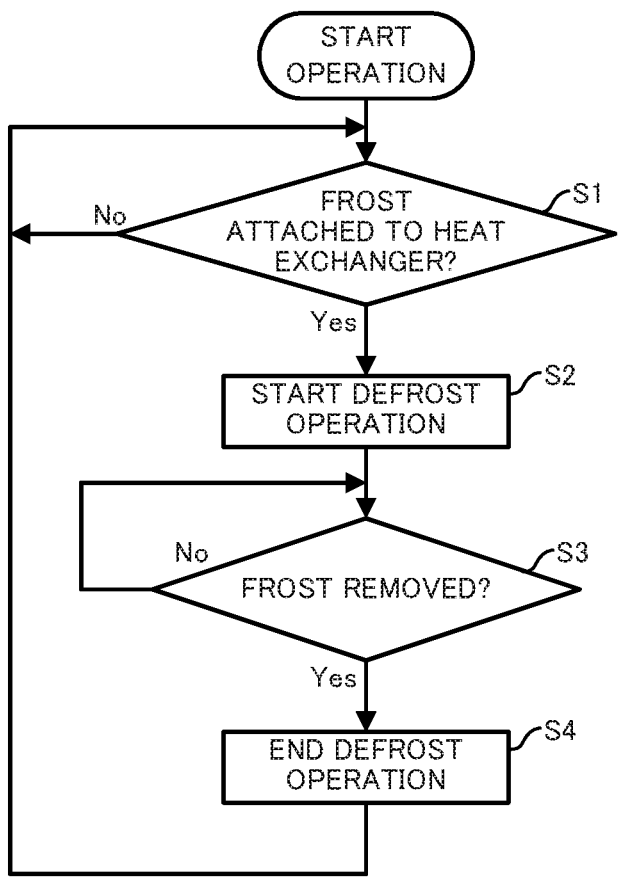
FIG. 6 is a flowchart illustrating a defrosting method.

Upon the start of ventilation operation of the ventilator 100 as illustrated in FIG. 6, the ventilator 100 determines whether frost is attached to the heat exchanger 10 (step S1). Specifically, the calculation circuit of the temperature sensor 11 determines whether the sensed temperature is below the first threshold. Further, if the temperature sensor 11 is arranged in the exhaust air duct B2, the calculation circuit of the temperature sensor 11 determines whether the sensed temperature exceeds the second threshold.

Upon determination that frost is not attached to the heat exchanger 10 (NO in step S1), the ventilator 100 repeats the determination of step S1. However, upon determination that frost is attached to the heat exchanger 10 (YES in step S1), the ventilator 100 starts the defrosting operation (step S2). Specifically, in accordance with the signal output from the temperature sensor 11, after air flows into the supply air duct B1, the defroster 12 heats the air.

Thereafter, the ventilator 100 determines whether the frost attached to the heat exchanger 10 is removed (step S3). Specifically, the calculation circuit of the temperature sensor 11 determines whether the sensed temperature is greater than or equal to the first threshold.

Upon determination that the frost is not removed (NO in step S3), the ventilator 100 repeats the determination of step S3. However, upon determination that the frost is removed (YES in step S3), the ventilator 100 ends the defrosting operation (step S4). Specifically, in response to cessation of the signal output from the temperature sensor 11, after air flows into the supply air duct B1, the defroster 12 stops the heating of the air. Thereafter, the ventilator 100 repeats the processing of step S1 and subsequent processing.

In the aforementioned manner, when the frost attaches to the heat exchanger 10, the defroster 12 defrosts the heat exchanger 10 by, after air flows into the supply air duct B1, causing a change in the state of the air by heating the air. Such operation enables defrosting without causing lowering of the ventilation air amount. Thus in addition to maintaining in the interior space A1 a comfortable air environment as typified by an air environment having a comfortable $CO_2$ concentration, the thermal load of the interior space A1 can be lowered, and energy utilization efficiency can be increased.

Embodiment 2

Figure 7:
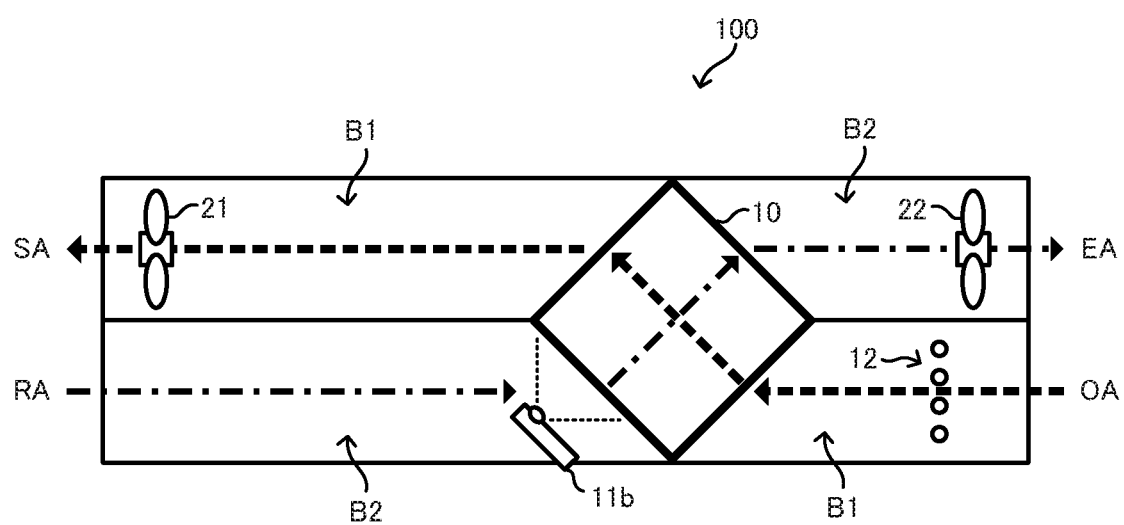
FIG. 7 is a drawing illustrating a configuration of a ventilator according to Embodiment 2.

Embodiment 2 is described next mainly with respect to points of difference relative to the aforementioned Embodiment 1. Further, structures that are the same or equivalent to those of the aforementioned Embodiment 1 are assigned the same reference symbols, and description of such structures is omitted or abbreviated. The present embodiment differs from Embodiment 1 in that the ventilator 100 of the present embodiment, as illustrated in FIG. 7, has a light intensity sensor 11b rather than the temperature sensor 11.

The light intensity sensor 11b is configured to include a light source as typified by an LED, a photoreceptor element, and the calculation circuit, and is arranged in the exhaust air duct B2. The light intensity sensor 11b uses light to illuminate the heat exchanger 10, receives reflected light from the heat exchanger 10, and senses intensity of the reflected light. When the frost attaches to the heat exchanger 10, the amount of this reflected light increases, and thus the intensity of the reflected light sensed by the light intensity sensor 11b becomes high.

The light intensity sensor 11b senses the attachment of the frost to the heat exchanger 10 by determination of whether the sensed intensity of light exceeds a predetermined third threshold. Then upon determination that the frost is attached to the heat exchanger 10, the light intensity sensor 11b outputs to the defroster 12 the signal indicating attachment of frost to the heat exchanger 10. Thus the attachment of frost to the heat exchanger 10 is sensed directly, thereby enabling defrosting of the heat exchanger 10.

Embodiment 3

Figure 8:
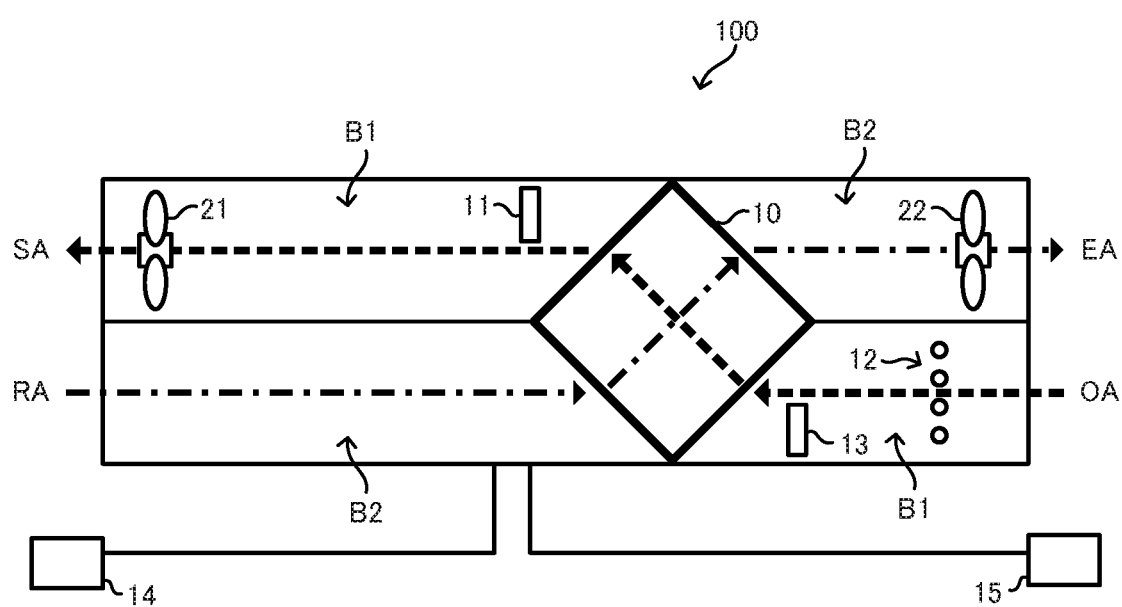
FIG. 8 is a drawing illustrating a configuration of a ventilator according to Embodiment 3.

Embodiment 3 is described next mainly with respect to points of difference relative to the aforementioned Embodiment 1. Further, structures that are the same or equivalent to those of the aforementioned Embodiment 1 are assigned the same reference symbols, and description of such structures is omitted or abbreviated. The present embodiment differs from Embodiment 1 in that the ventilator 100 of the present embodiment, as illustrated in FIG. 8, has a temperature sensor 13 and state detectors 14 and 15.

The temperature sensor 13 is configured to include a temperature sensor and is arranged between the defroster 12 and the heat exchanger 10. The temperature sensor 13 senses the temperature of the air heated by the defroster 12 and sends to the defroster 12 notification indicating results of the sensing.

The state detector 14 detects a state of the air of the interior space and sends results of the detection to the defroster 12. Further, the state detector 15 detects a state of the outside air and sends results of the detection to the defroster 12. The state detector 14 according to the present embodiment measures air temperature of the interior, the state detector 15 according to the present embodiment measure air temperature of the outside, and these detectors send results of the measurements to the defroster 12.

The defroster 12 is configured to include a feedback circuit. Further, when the defroster 12 heats air, the defroster 12 causes increases and decreases in an amount of heating such that the temperature sensed by the temperature sensor 13 approaches a predetermined target temperature. That is to say, the defroster 12 heats the air and adjusts the temperature sensed by the temperature sensor 13 to a predetermined target temperature.

The target temperature is determined beforehand in accordance with the states of air of the interior space and the outside air detected by the state detectors 14 and 15. For example, when the temperature of at least one of the interior air RA and the outside air OA is higher than a fourth threshold, the target temperature is set as a temperature lower than the target temperature set when both the interior air RA and the outside air OA are lower than the fourth threshold.

Thus the defroster 12 can perform appropriate heating in accordance with the conditions of the interior and the outside. For example, excess consumption of energy by the defroster 12 can be avoided.

Further, the state of the air detected by the state detectors 14 and 15 is not limited to the temperature, and may include humidity. Further, the ventilator 100 may have a configuration that omits one of either the state detector 14 or the state detector 15.

Embodiment 4

Figure 9:
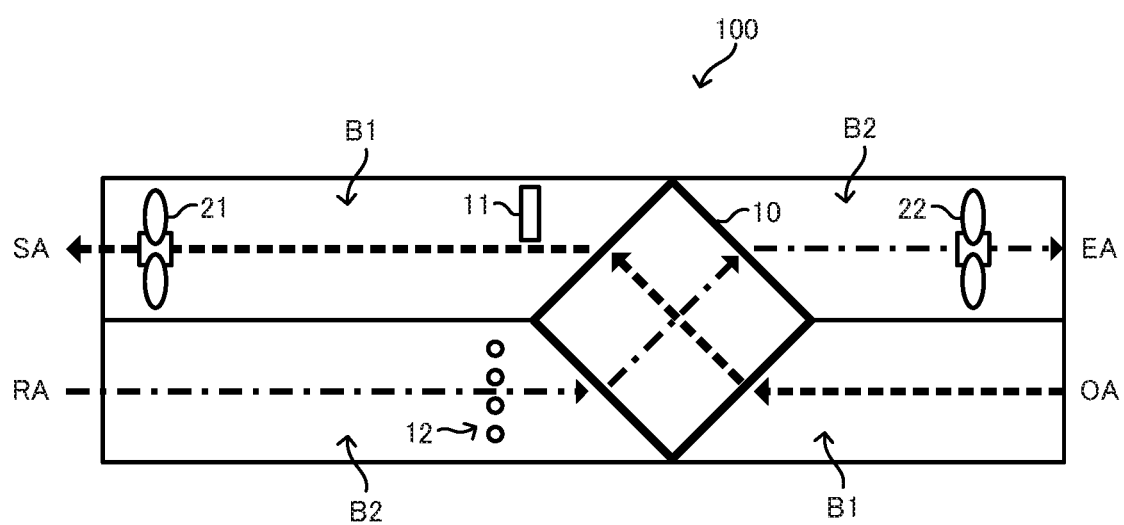
FIG. 9 is a drawing illustrating a configuration of a ventilator according to Embodiment 4.

Embodiment 4 is described next mainly with respect to points of difference relative to the aforementioned Embodiment 1. Further, structures that are the same or equivalent to those of the aforementioned Embodiment 1 are assigned the same reference symbols, and description of such structures is omitted or abbreviated. The present embodiment differs from Embodiment 1 in that the ventilator 100 of the present embodiment, as illustrated in FIG. 9, has the defroster 12 arranged in the exhaust air duct B2.

The defroster 12 defrosts the heat exchanger 10 by causing a change in the state of the air by, after the air flows into the exhaust air duct B2, heating the air. Specifically, after the interior air RA flows into the exhaust air duct B2, the defroster 12 heats such air. The air heated by the defroster 12 flows into the heat exchanger 10, thereby causing a rise in the temperature of the heat exchanger 10. Defrosting of the heat exchanger 10 is performed by such operation.

Figure 10:
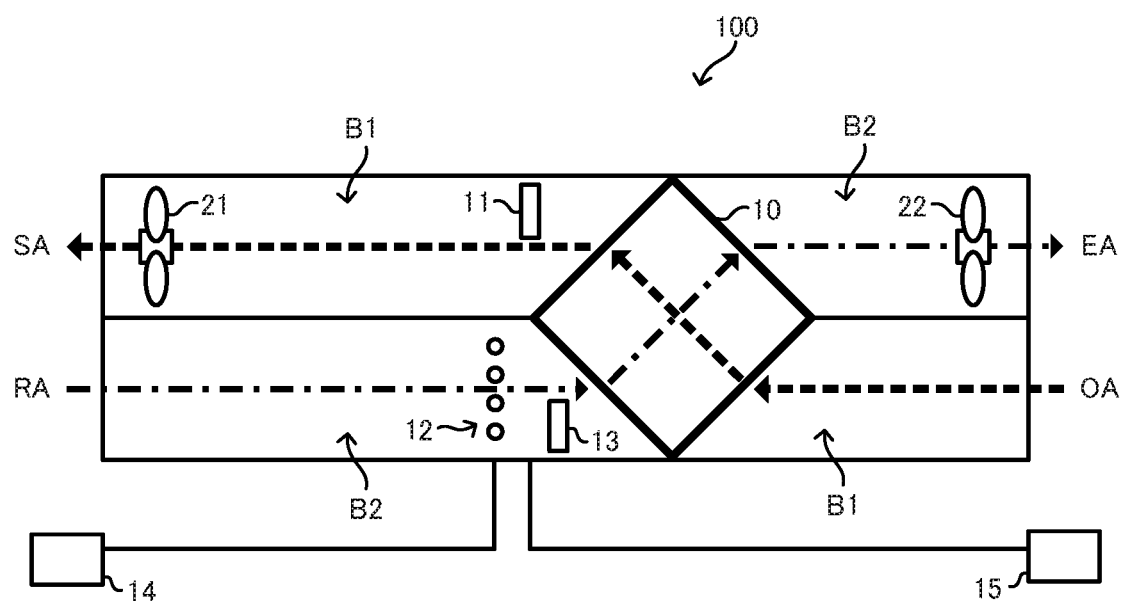
FIG. 10 is a drawing illustrating another configuration of the ventilator according to Embodiment 4.

Further, as illustrated in FIG. 10, the ventilator 100 may be configured to include the temperature sensor 13 and the state detectors 14 and 15 in the same manner as in Embodiment 3. Further, the ventilator 100 may have, rather than the temperature sensor 11, the light intensity sensor 11b as in Embodiment 2.

Embodiment 5

Figure 11:
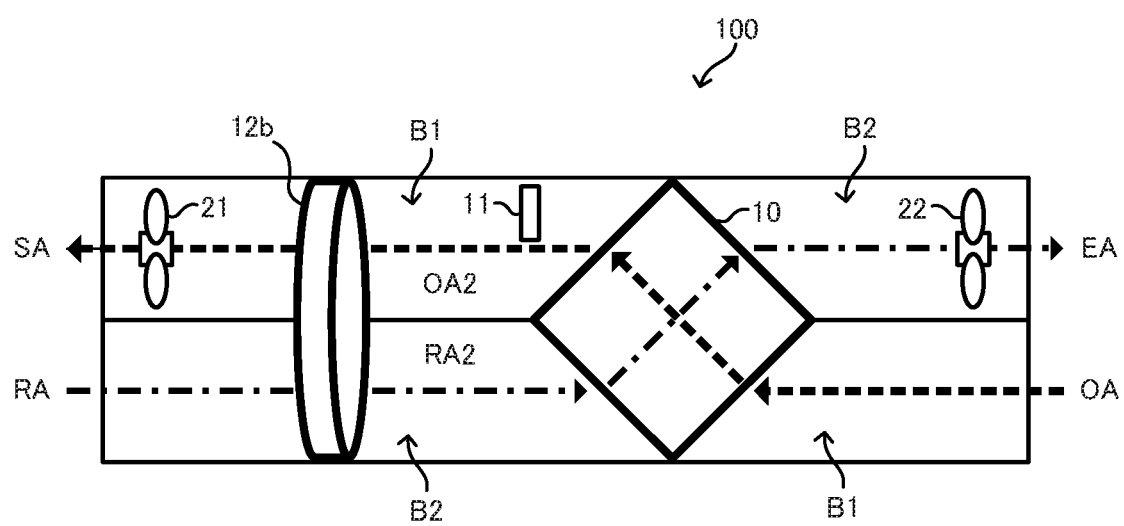
FIG. 11 is a drawing illustrating a configuration of a ventilator according to Embodiment 5.

Embodiment 5 is described next mainly with respect to points of difference relative to the aforementioned Embodiment 1. Further, structures that are the same or equivalent to those of the aforementioned Embodiment 1 are assigned the same reference symbols, and description of such structures is omitted or abbreviated. The present embodiment differs from Embodiment 1 in that the ventilator 100 of the present embodiment, as illustrated in FIG. 11, has a defroster 12b rather than the defroster 12.

The defroster 12b is configured to include a rotary-type absorption member for adsorption of moisture included in the air, and is arranged within the ventilator 100. Upon frost attaching to the heat exchanger 10 and the signal being output from the temperature sensor 11, the defroster 12b causes rotation of the absorption member to execute the defrosting operation. Specifically, the defroster 12b defrosts the heat exchanger 10 by changing the state of the interior air RA by, after the interior air RA flows into the exhaust air duct B2, adsorbing the moisture included in such air.

Figure 12:
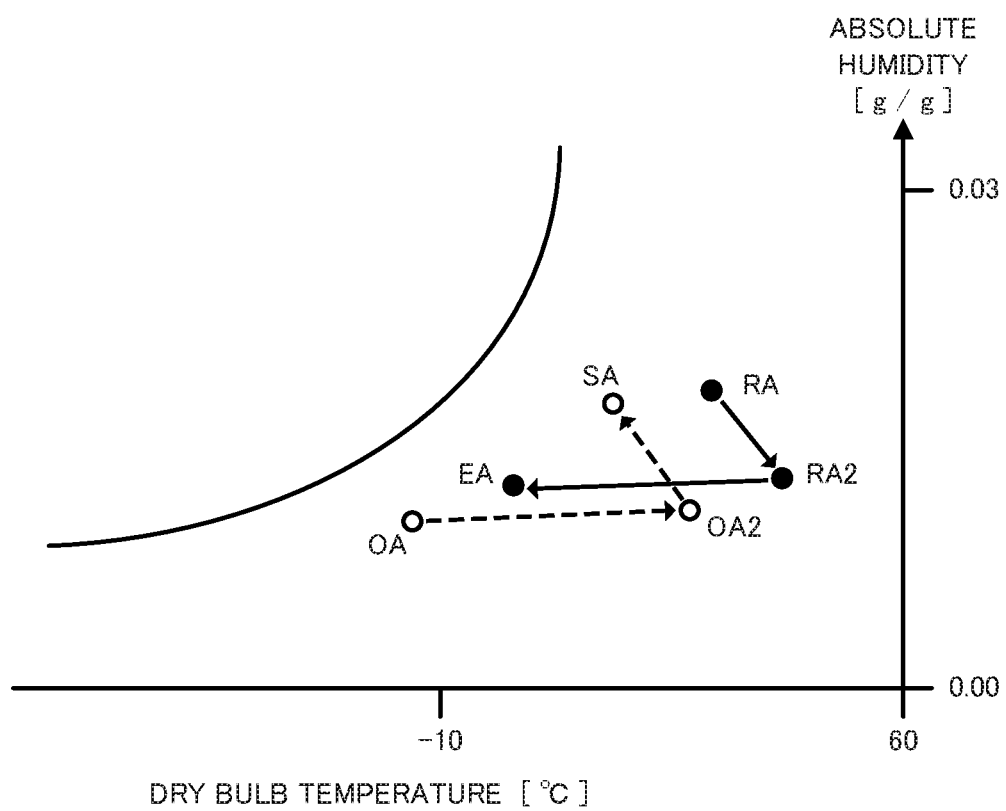
FIG. 12 is a psychrometric chart illustrating an example of a change of state of the air after arrangement of an adsorption member.

FIG. 12 illustrates an example of changes of state of air occurring when the defroster 12b performs the defrosting operation. In this embodiment, "OA2" illustrated in FIG. 11 and FIG. 12 indicates air after passage through the heat exchanger 10 in the supply air duct B1 and prior to passing through the absorption member of the defroster 12. Further, "RA2" in the same drawings indicates the state of air after passage through the absorption member of the defroster 12 within the exhaust air duct B2 and prior to passing through the heat exchanger 10.

As made clear by FIG. 12, when the interior air RA passes through the absorption member, the moisture included in the air is adsorbed, and thus the humidity decreases, and also the temperature rises due to heat of adsorption. When such high-temperature, low-humidity air flows into the heat exchanger 10, the frost attached to the heat exchanger 10 melts, thereby performing defrosting of the heat exchanger 10.

Further, the defroster 12b may continue rotation of the absorption member, even after the removal of the frost from the heat exchanger 10, to cause, after air flows into the exhaust air duct B2, a change in the state of such air. When the rotation continues, attachment of frost to the heat exchanger 10 can be prevented by air that has a lower humidity than the interior air RA flowing into the heat exchanger 10. Further, the defroster 12b may defrost the heat exchanger 10 by changing the state of the outside air OA by, after the outside air OA flows into the supply air duct B1, adsorption of the moisture included in such air.

Although embodiments of the present disclosure are described above, the present disclosure is not limited to the aforementioned embodiments.

For example, the attachment of frost to the heat exchanger 10 may be sensed using a structure other than that of the temperature sensor 11 or the light intensity sensor 11b. The temperature sensor 11 and the light intensity sensor 11b may send notification of the sensed temperature and light intensity to the defrosters 12 and 12b, and a calculation circuit contained in the defroster 12 and 12b may execute the determination processing using a threshold to sense the attachment of frost to the heat exchanger 10.

Further, the heat exchanger 10 may be a static-type heat exchanger or a rotary-type heat exchanger.

Further, the first threshold and the second threshold may be determined in accordance with the state of the air of at least one of the outside or interior.

Figure 13:
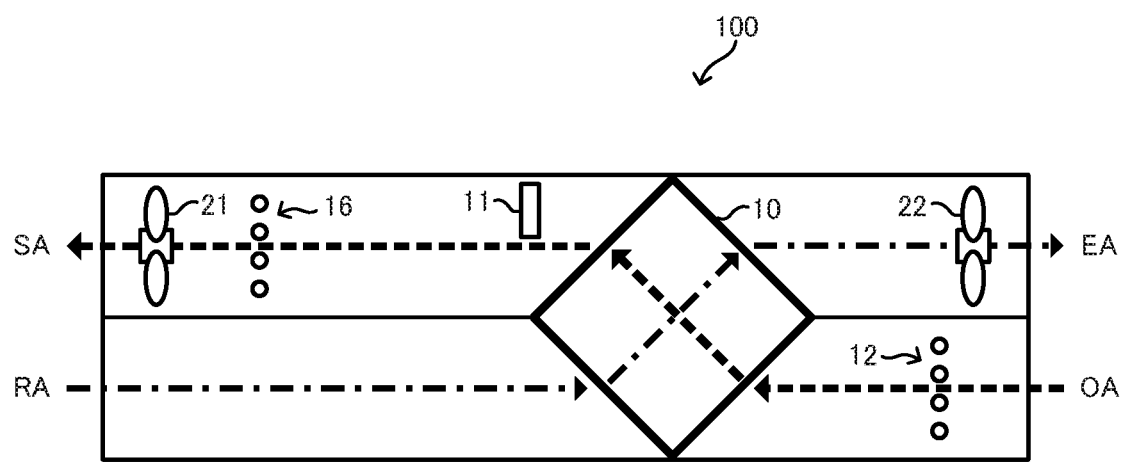
FIG. 13 is a first drawing illustrating a ventilator to which is appended a heater.
Figure 14:
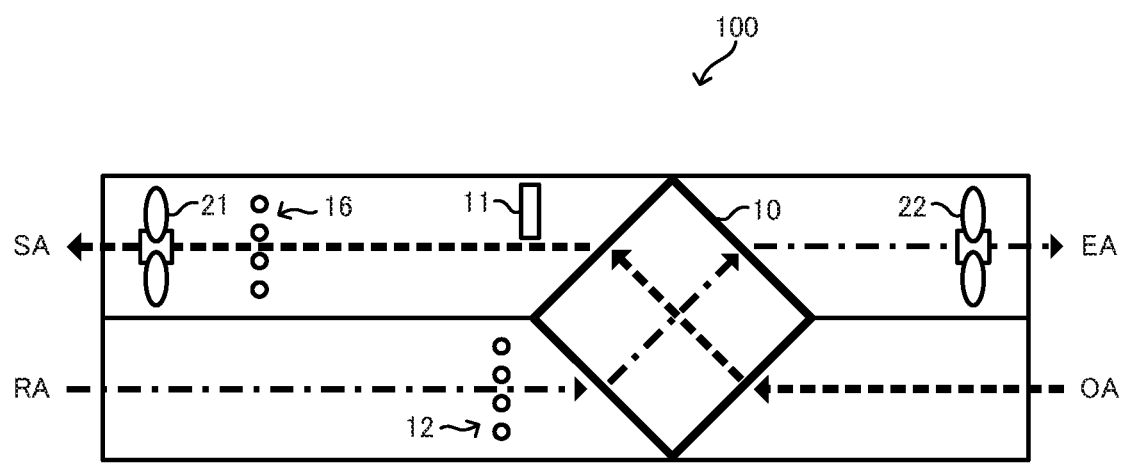
FIG. 14 is a second drawing illustrating a ventilator to which is appended a heater.
Figure 15:
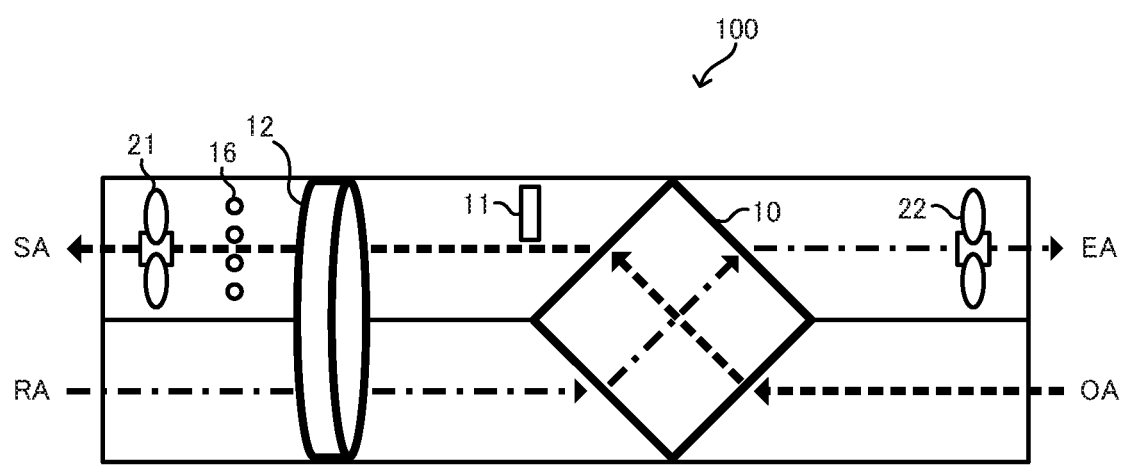
FIG. 15 is a third drawing illustrating a ventilator to which is appended a heater.

Further, as illustrated in each of FIG. 13 to FIG. 15, the heater 16 in the supply air duct B1 may be appended to the structure of the ventilator 100 of each of Embodiments 1, 4, and 5. The heater 16 may be configured to include a gas heater, an electric heater, or a heat pump device, for example, and heats the air within the supply air duct B1. By this means, the supplied air SA is heated, and the heat load of the interior space A1 is decreased.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is useful for defrosting of a heat exchanger included in a ventilator.

REFERENCE SIGNS LIST

1000 Air conditioning system
100 Ventilator
10 Heat exchanger
11, 13 Temperature sensor
11b Light intensity sensor
12, 12b Defroster
14, 15 State detector
16 Heater
21 Supply air blower
22 Exhaust air blower
300 Temperature-humidity adjustment system
31 Outdoor unit
32-34 Indoor unit
A1 Interior space
B1 Supply air duct
B2 Exhaust air duct

The invention claimed is:

1. A ventilator including an exhaust air duct for exhausting air from an interior space to an outside and a supply air duct for supplying air from the outside to the interior space, the ventilator comprising:
   a heat exchanger configured to perform heat exchange between air passing through the exhaust air duct and air passing through the supply air duct,
   a temperature sensor configured to sense, within the exhaust air duct, a temperature of the air after passing through the heat exchanger, and
   a defroster configured to, when frost attaches to the heat exchanger and the temperature of the air within the exhaust air duct sensed by the temperature sensor exceeds a threshold, defrost the heat exchanger by, after the air flows into the exhaust air duct or the supply air duct, changing a state of the air.

2. The ventilator according to claim 1, wherein the defroster changes the state of the air by, after the air flows into the exhaust air duct or the supply air duct, heating the air.

3. The ventilator according to claim 2, wherein
   the temperature sensor is a first temperature sensor, and the ventilator further comprises a second temperature sensor configured to sense a temperature of the air heated by the defroster, and
   the defroster changes the state of the air by, after the air flows into the exhaust air duct or the supply air duct, heating the air to adjust the temperature sensed by the second temperature sensor to a predetermined temperature.

4. The ventilator according to claim 3, further comprising: a state detector configured to detect a state of air of the interior space or the outside, wherein the defroster adjusts the temperature sensed by the second temperature sensor to a temperature predetermined in accordance with the state detected by the state detector.

5. The ventilator according to claim 1, wherein the defroster changes the state of the air by, after the air flows into the exhaust air duct or the supply air duct, adsorbing moisture included in the air.

6. A defrosting method comprising: when frost attaches to a heat exchanger configured to perform heat exchange between (a) air passing through an exhaust air duct for exhausting air from an interior space to an outside and (b) air passing through a supply air duct for supplying air from the outside to the interior space and when a temperature of the air within the exhaust air duct, after passing through the heat exchanger, exceeds a threshold, defrosting the heat exchanger by, after the air flows into the exhaust air duct or the supply air duct, changing a state of the air.

* * * * *